United States Patent [19]

Hoffmann et al.

[11] Patent Number: 4,811,562

[45] Date of Patent: Mar. 14, 1989

[54] ADJUSTING DRIVE

[75] Inventors: Ruediger Hoffmann, Sindelfingen; Dieter Feichtiger, Aidlingen; Josef Schumacher, Reutlingen; Peter H. Haller, Stuttgart; Klaus-J. Heimbrodt, Treuchtlingen, all of Fed. Rep. of Germany

[73] Assignees: Daimler-Benz Aktiengesellschaft; Bornemann & Haller KG; Walter Alfmeier GmbH & Co., all of Fed. Rep. of Germany

[21] Appl. No.: 116,156

[22] Filed: Nov. 3, 1987

[30] Foreign Application Priority Data

Nov. 3, 1986 [DE] Fed. Rep. of Germany ....... 3637404

[51] Int. Cl.[4] .............................................. F16D 31/02

[52] U.S. Cl. ........................................ 60/370; 60/409; 60/412; 60/473; 60/475; 60/476

[58] Field of Search ................. 60/476, 473, 475, 370, 60/407, 409, 412

[56] References Cited

U.S. PATENT DOCUMENTS

| | | | |
|---|---|---|---|
| 2,640,323 | 6/1953 | McLeod | 60/476 X |
| 3,305,195 | 2/1967 | Eickmann | 60/476 X |
| 3,446,019 | 5/1969 | Bullough | 60/473 |
| 3,979,910 | 9/1976 | Levenberger | 60/476 |
| 4,642,986 | 2/1987 | Chetelin | 60/473 |

FOREIGN PATENT DOCUMENTS

| | | | |
|---|---|---|---|
| 2103701 | 8/1972 | Fed. Rep. of Germany . | |
| 2232956 | 1/1974 | Fed. Rep. of Germany . | |
| 2757623 | 6/1979 | Fed. Rep. of Germany | 60/476 |
| 379124 | 8/1932 | United Kingdom | 60/476 |

OTHER PUBLICATIONS

O&P 22, "olhydraulik und pneumatik", 1978, No. 8, p. 448.

*Primary Examiner*—Edward K. Look

*Attorney, Agent, or Firm*—Barnes & Thornburg

[57] ABSTRACT

A compact electric adjusting drive for locking systems, fan flaps or the like in motor vehicles includes a fluidic force transmission system between the electric motor and the adjusting element movable to and fro between two end positions.

10 Claims, 4 Drawing Sheets

Fig. 3
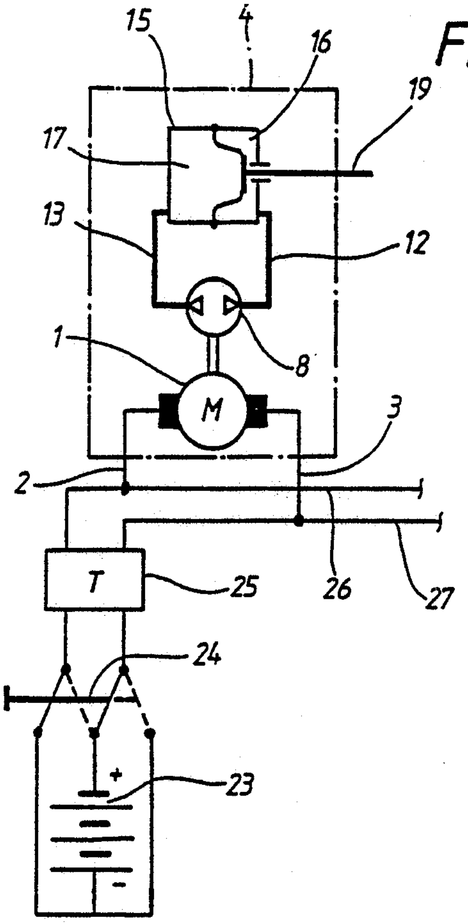
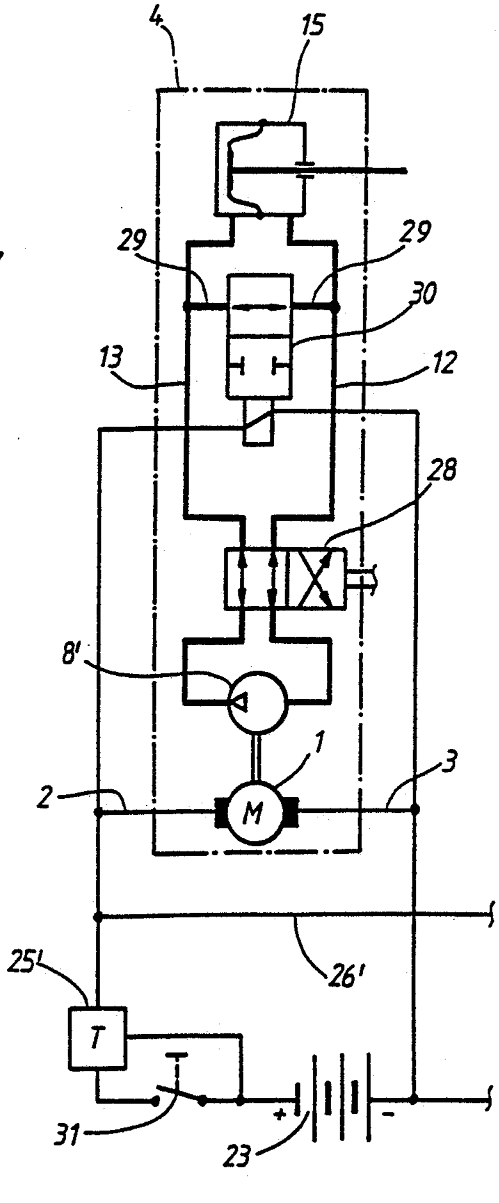
Fig. 4

ADJUSTING DRIVE

BACKGROUND AND SUMMARY OF THE INVENTION

The present invention relates to an adjusting drive with a closed housing, with an outwardly extending actuating member movable to and fro between two end positions by means of an electric motor and with a force transmission arranged in the same housing which during the operation of the electric motor transmits forces from its driving member connected with the shaft of the electric motor to its output member connected with the adjusting member.

An electrical adjusting drive of the aforementioned type is known from the DE-OS No. 28 45 844. This actuating or drive mechanism provided for use in central locking systems of motor vehicles includes in its housing an electric motor reversible in its direction of rotation and for the force transmission, a speed-reduction planetary gear transmission and an electromagnetically actuated friction clutch whose magnet winding is electrically connected in parallel with the electric motor. As a result thereof, only with a turned-on electric motor the torque existing at the transmission output is transmitted by way of the friction linings of the clutch to the adjusting member movable to and fro between two end positions which protrudes out of the housing. The relative movability achieved therewith between the adjusting member and a turned-off motor permits an easy manual actuation of the latching parts of the lock connected with the adjusting member by way of a linkage or jointed drive without the need that a slack or bridgeable detent device has to be provided in this linkage, as is the case in other known central locking systems.

However, by reason of the electromagnetic clutch, the energy requirement of the drive arrangement is very high. The friction linings of the clutch are parts subject to wear, and it may happen that by reason of residual magnetism the coil spring acting opposite the magnetic force is not able to separate the friction linings after the current is turned off. Furthermore, with each adjusting operation larger masses (planetary gear, friction disks) have to be accelerated in a rotary sense within a short period of time and have to be brought to standstill again in an equally short period of time. A high dynamic stressing of all force-transmitting members between the electric motor and the adjusting member results therefrom which becomes effective in a wear-enhancing manner if the running time of the adjusting drive is not to be designed relatively long in a comfort-reducing manner.

The present invention is concerned with the task to so construct an electric adjusting drive of the aforementioned type that the force transmission between the electric motor and the adjusting member does not require any energy input of its own, cannot block and permits short adjustment durations for each adjusting operation without high dynamic stresses and loads.

The underlying problems are solved according to the present invention in that the driving part of the force transmission is constructed as pump with reversible feed direction, in that the output part of the force transmission is constructed as working element movable by fluidic pressure forces produced by the pump, and in that the pump and working element are arranged inside of the housing within a fluidic system, out of which the adjusting member is extended in a pressure-tight member.

The use of a fluidic force transmission between the electric motor and the adjusting member reduces the weight of the movable parts of the adjusting drive and therewith, on the one hand, the power input thereof and, on the other, the dynamic load of the force transmission. Additionally, such an arrangement also operates nearly wear-free and noiselessly. Both hydraulic as also pneumatic components can be used in the system of the present invention even though the pneumatic force transmission is preferred. The latter can be operated with a simple pump and a light diaphragm piston working element in a weight-saving and reliable manner and therebeyond raises no special problems with sealing the closed fluidic system, especially does not raise any such problems when the system air is under atmospheric pressure in the rest or inoperative condition. It may be necessary to provide in the pneumatic system slight defined leakages to the surrounding atmosphere, for example, sinter throttles or the like, within a housing wall in order that under all circumstances the pressure difference necessary for the displacement of the working element can be built up at the working element and a rate of fluid flow, even though small, is always assured at the pump.

By the simultaneous actuation of the piston working element on one piston side with excess pressure and on the other piston side with vacuum, respectively, vice versa, depending on the adjusting direction of the adjusting member, respectively, feed direction of the pump, the effective areas of the piston and the space content of the fluidic system can be kept small with relatively high adjusting forces.

As a result thereof, the following advantages are achieved:

- compact adjusting drive housing,
- slight cushioning effect of the compressed air,
- very short running periods of motor and pump per adjusting operation by reason of the small volumetric rate of flow in the pump.

The two last-mentioned advantages are also important in a comparison of the adjusting drive according to the present invention with known components of electro-pneumatic central locking systems. In such systems, for example, as described in the DE-PS No. 31 49 071, a central motor-pump-unit is provided which actuates the single-chamber lock-adjusting elements connected to a pump pressure nipple by way of hose lines alternately with excess pressure, respectively, vacuum for unlocking and locking the locks coordinated thereto. Another pressure nipple of the pump is open toward the atmosphere; the fluidic system is therefore alternately vented and exhausted.

As a result thereof, the volumetric rate of flow of the pump and therewith the length of life thereof and the cushion effect of the air transported in the system become large. Additionally, for purposes of multi-position actuation of the central motor-pump-unit, electrical lines to the key-operated locks must be provided in addition to the hose connections.

Above all during the preassembly of motor vehicle doors with their entire equipments inclusive central locking elements, plug-type connections must be provided for each hose line which are then plugged together during the assembly of the completed door at the body with the corresponding pump connection lines. In comparison to electric plug-type connections, the pneumatic plug elements mechanically stressed by pressure forces are exposed to considerably larger loads and stresses and therebeyond form also undesirable throttling places in the course of the hose lines.

A working element coordinated to the motor-pump-unit is already mentioned in the system according to the DE-PS No. 31 49 071 and is correspondingly illustrated in the figure. However, differing from the adjusting drive according to the present invention, this working element is connected only with an electric switch—for the limit de-energization of the electric motor—and is connected only on one side with the pump, in parallel with the further pneumatic lock adjusting elements. Additionally, it responds later than the lock-adjusting elements, i.e., requires a longer running period of the pump.

A pneumatic brake force servo device is disclosed in the DE-OS No. 22 32 956 whose piston, for purposes of force increase, is acted upon by a pump simultaneously on one side with excess pressure and, on the other side, with vacuum. As in the adjusting drive according to the present invention, the pressure difference between the two piston sides is therefore increased in this publication. Consequently, smaller dimensions of the working element can be realized. At the same time, however, an excess pressure and a vacuum storage device each are provided in the fluidic system of this prior art brake force servo-device so that this publication provides no indication for a compact adjusting drive with simultaneous excess pressure and vacuum actuation of a working element in a closed fluidic system having a small fluid volume.

The adjusting drive according to the present invention combines the advantages of the electric motor, i.e., simple, reliable feed and control connections;
rapid start during engagement and
high reliability, with those of a fluidic, especially pneumatic force transmission, i.e., low-wear and low-noise operation;
small dynamic loads by reason of smaller movable masses;
simple construction;
ease of operation in the rest or inoperative condition; and
fluidic system combining the function of speed reduction
transmission and clutch.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention and wherein:

FIG. 3 is a schematic circuit diagram for the adjusting drive according to FIGS. 1 and 2;

FIG. 4 is a schematic circuit diagram for a modification of the adjusting drive;

DETAILED DESCRIPTION OF THE DRAWINGS

Figure 1:
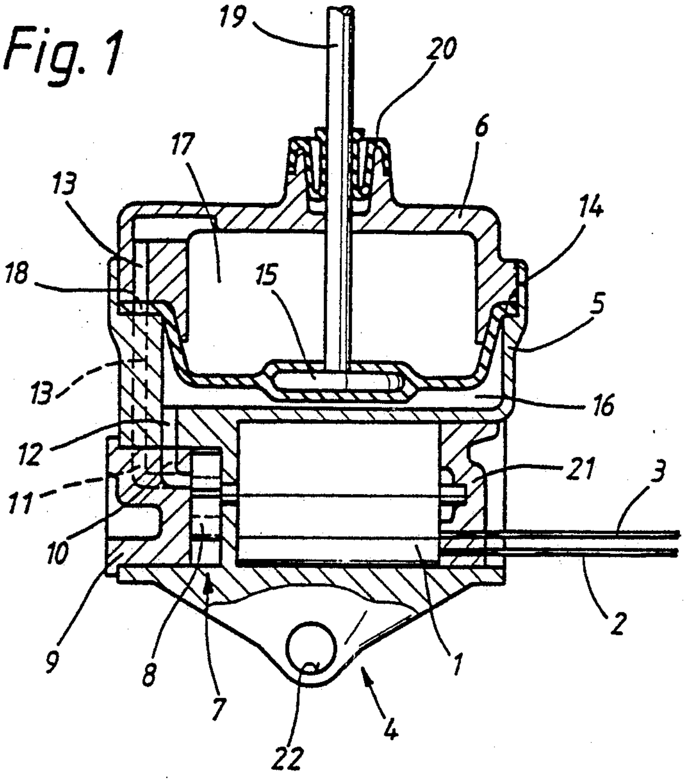
FIG. 1 is a cross-sectional view through an electric adjusting drive with pneumatic force transmission in accordance with the present invention.

Referring now to the drawing wherein like reference numerals are used throughout the various views to designate like parts, an adjusting drive includes an electric motor 1 with electrical connections 2 and 3. The electric motor 1 is inserted into a housing generally designated by reference numeral 4 which, in its turn, consists of two housing parts 5 and 6. A pump chamber generally designated by reference numeral 7 is provided in the housing part 5 accommodating the electric motor 1, in which a vane-type pump 8 secured on the armature shaft of the electric motor 1 is arranged. The pump chamber 7 includes two pressure connections 10 and 11 within a plug 9. The pressure connection 10 connects a flow channel 12 with the pump chamber 7 while the pressure connection 11 is connected with a flow channel 13.

A diaphragm 14 of a diaphragm piston working element 15 is sealingly clamped-in between the two housing parts 5 and 6. The diaphragm 14 separates a first working chamber 16 which is delimited by the diaphragm 14 and the housing part 5, from a second working chamber 17 which is delimited by the diaphragm 14 and the housing part 6. The flow channel 12 terminates in the first working chamber 16. It extends only inside of the housing part 5. The flow channel 13 extends through a wall of the housing part 5, through a hole 18 in the diaphragm 14 clamped-in on all sides for sealing the channel and through a wall of the housing part 6 and terminates in the second working chamber 17 of the piston working element 15 which is connected with an adjusting member 19. The adjusting member 19 extends out of the housing part 6 into the atmosphere whereby the passage opening is sealed off by a roller bellows seal 20.

The plug 9 seals the pump chamber 7 against the outside air whereas the bore of the housing part 5 accommodating the electric motor 1 is also sealingly closed off by a further plug 21. The plug 21 also serves for the sealed lead-out of the electric connections 2 and 3 from the electric motor 1. Furthermore, a seal is provided between the pump chamber 7 and the electric motor 1, for example, on the armature shaft thereof.

The two plugs 9 and 21 can be simply pressed-in or can be secured at the housing part 5 in any other suitable manner. Especially in connection with the plug 9 having the pressure connections 10 and 11, care is taken, for example, by a corresponding shape that the pressure connections 10 and 11 reach the correct position with respect to the flow channels 12 and 13 already during the insertion of the plug 9 and cannot deviate from this position also in the installed condition. The illustrated arrangement permits a simple assembly and disassembly of the motor-pump-unit.

Figure 2:
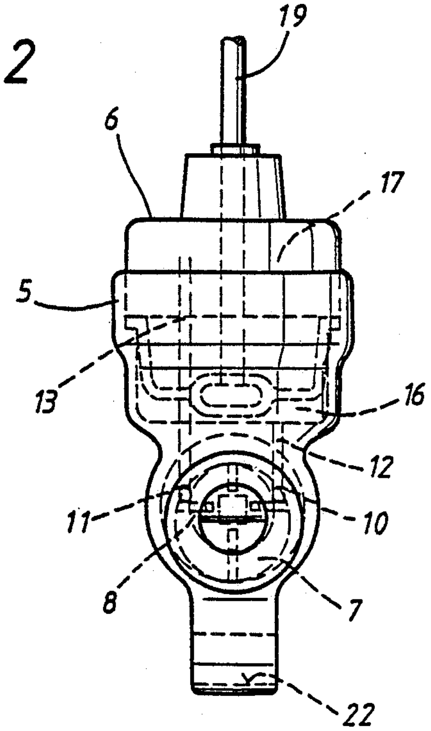
FIG. 2 is an elevational view of the adjusting drive actuation of FIG. 1, rotated through 90°.

The arrangement of the vane-type pump 8 in the pump chamber 7 as well as the layout of the two flow channels 12 and 13 from the pressure connections 10 and 11 to the working chambers 16 and 17 of the diaphragm piston working element 15 are shown in the elevational view of FIG. 2. By means of a bore 22 in the housing part 5, the adjusting drive is secured in proximity to a locking means connected with the adjusting member 19 or to a ventilation flap or the like to be displaced into the open or closed position.

The schematic diagram according to FIG. 3 illustrates the manner of operation of the adjusting drive according to FIGS. 1 or 2 in one embodiment indicated only for exemplary purposes. A voltage source 23 is connected by way of a pole-reversing switch 24 with a timing element 25. Two lines 26 and 27 extend out of this timing element 25; the connection 2 of the electric motor 1 is connected to the line 26 and the connection 3 of the electric motor to the line 27.

Further adjusting drives, for example, of a central locking system can be connected in parallel with the two lines 26 and 27.

The timing element 25 responds to a change in voltage polarity which takes place at its input terminals by switching the pole-reversing switch 24. It switches the corresponding polarity for a limited time interval to the lines 26 and 27 and therewith also to the connections 2 and 3 of the electric motor 1. The latter starts to run and drives the pump 8 which, in the illustrated position, thereafter acts upon the flow channel 12 and the working chamber 16 of the working element 15 with excess pressure and at the same time on the flow channel 13 and the working chamber 17 with vacuum. The working element 15 thereupon snaps from the illustrated right position into the opposite position and correspondingly moves along the adjusting member 19. After expiration of the fixed time interval the timing element 25 disconnects the lines 26 and 27 and de-energizes the electric motor 1. When the pump 8 has come to standstill, an equalization of the pressure difference between the two working chambers 16 and 17 takes Place immediately by way of the flow channels 12 and 13 and through the pump 8, respectively, the pump chamber 7 (FIG. 2). In the rest condition of the pump rotor, the sealing lips are retracted in a known manner into the corresponding grooves of the rotor, out of which they are pulled by centrifugal forces during the operation of the pump. A flow short-circuit thus occurs in the vane-type pump 8 during standstill.

The illustrated arrangement permits an engagement of the adjusting drive by switching the polarity-reversing switch 24. The electric motor therefore rotates during each operating cycle opposite to the preceding operating cycle.

If a multi-position actuation of a central locking system constructed corresponding to FIG. 3 is to be possible, then the further non-manually key-actuated pole-reversing switches must be synchronized with the respectively switched pole-reversing switch which can be attained in the most simple manner by a coupling of the adjusting member 19 with the pole-reversing switch 24 in a known manner.

A circuit modification of FIG. 3 is illustrated in FIG. 4 where the electric motor 1 drives a pump 8′ rotatable in only one direction. The feed direction reversal to the two flow channels 12 and 13 is thereby controlled by a 4/2 directional control valve 28 which, after each operating cycle, respectively, adjusting operation of the working element 15, is shifted mechanically or electrically into its respective other stable shifting position.

If a flow short circuit through the pump 8′ is not possible, then the pressure difference equalization in the closed fluidic system can take place by way of a by-pass line 29 and a solenoid valve 30 arranged in the same. If the electric motor 1 is turned on for driving the pump 8′, then the solenoid valve 30 connected in parallel with the electric motor 1 closes the by-pass line 29 so that during the running period of the electric motor 1 and of the pump 8′ which is limited by a timing element 25′, the build-up of the pressure difference in the working element 1 is assured.

An electric motor 1 always operated in the same direction of rotation can be turned-on and turned-off in a particularly simple manner. A key switch 31 has to be closed manually or by means of a key for a short period of time and produces a voltage pulse for the timing element 25′. The latter thereby applies for a limited time interval the voltage of the voltage source 23 to the connections 2 and 3 of the electric motor 1 and again turns off the latter after the lapse of this time interval. With the use of pulse switches 31, a central locking system with adjusting drives according to the schematic diagram in FIG. 4 and with multi-position operation requires no synchronization of the electrically parallelly connected switches coordinated to the different locking devices.

The use of the fluidic force transmission in a closed system allows one to expect such a high switching, respectively, adjusting reliability of the adjusting drive that the limitation of the respective length of life thereof by an electronic timing element appears acceptable.

Figure 5:
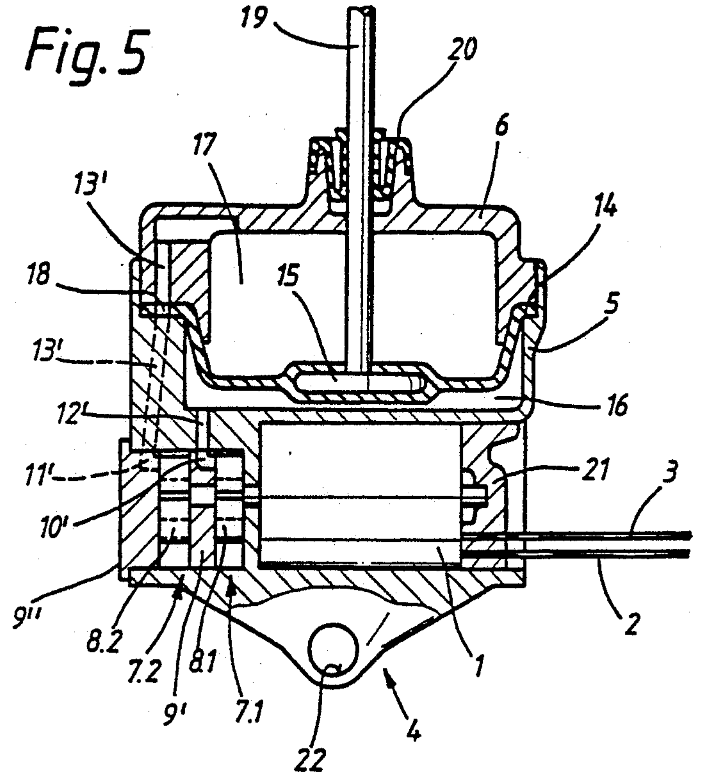
FIG. 5 is a cross-sectional view through a modified embodiment of an adjusting drive in accordance with the present invention.

FIG. 5 illustrates a modification of the adjusting drive with a two-rotor pump which is functionally equivalent in many respects to the first embodiment. Consequently, reference will be made to FIGS. 1 and 2 for the parts designated with the same reference numerals.

Vane-type pump rotors 8.1 and 8.2 are secured on the armature shaft of the electric motor 1 and are arranged in respective pump chambers 7.1 and 7.2 within the housing part 5. The two pump chambers 7.1 and 7.2 are sealed off with respect to one another by a sealing insert 9′ non-rotatably attached in the housing part 5. The pump chamber 7.2 is closed off against the outside by a plug 9″ also fixed against rotation.

The sealing insert 9′ includes a pressure connection 10′ which connects the pump chamber 7.1 with the flow channel 12′ which in its turn terminates in the working chamber 16 of the piston working element 15.

The plug 9″ includes a pressure connection 11′ which connects the pump chamber 7.2 with a flow channel 13′ which in its turn terminates in the working chamber 17 of the piston working element 15 and extends in walls of both housing parts 5 and 6 as well as through the opening 18 of the diaphragm 14.

Figure 6:
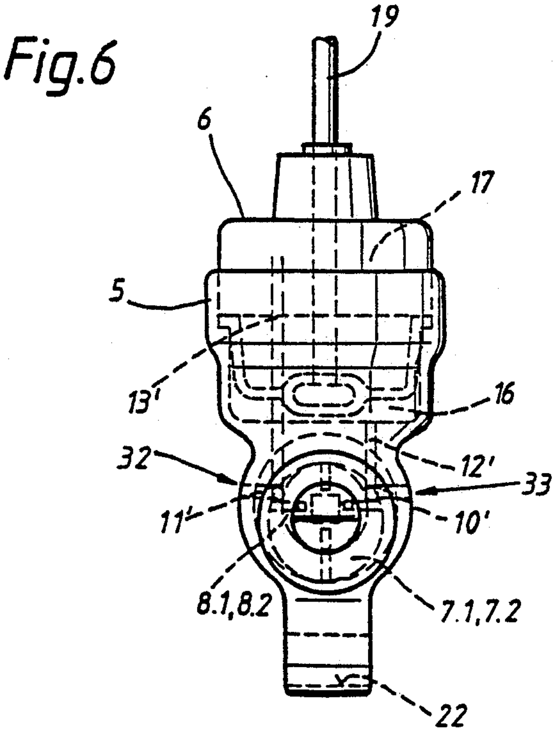
FIG. 6 is an elevational view of the adjusting drive of FIG. 5, rotated through 90°.

Furthermore, an atmosphere connection 32—arranged in the sealing insert 9′ and terminating in the pump chamber 7.1—and an atmosphere connection 33—arranged in the plug 9″ and terminating in the pump chamber 7.2—are schematically indicated in FIG. 6.

Both vane-type pump rotors 8.1 and 8.2 are driven in the same direction with a rotating electric motor 1. In order to displace the piston working element 15 from the lower position illustrated in FIG. 6 into the opposite upper position, the electric motor 1 must rotate to the left (counterclockwise). Then the pump rotor 8.1 produces excess pressure at the pressure connection 10′, in the flow channel 12′ and in the working chamber 16 by sucking-in air by way of the atmosphere connection 32 of its pump chamber 7.1; at the same time, the pump rotor 8.2 produces vacuum at the pressure connection 11' and evacuates the working chamber 17 by way of the flow channel 13', the pressure connection 11' and the atmosphere connection 33', where the exhaust air reaches the atmosphere.

By reason of the pressure difference between its working chambers 16 and 17, the piston working element 15 snaps from the illustrated into the opposite position. By a reversal of the direction of rotation of the electric motor 1 and of the two pump rotors 8.1 and 8.2 the reverse adjusting operation is initiated.

Figure 7:
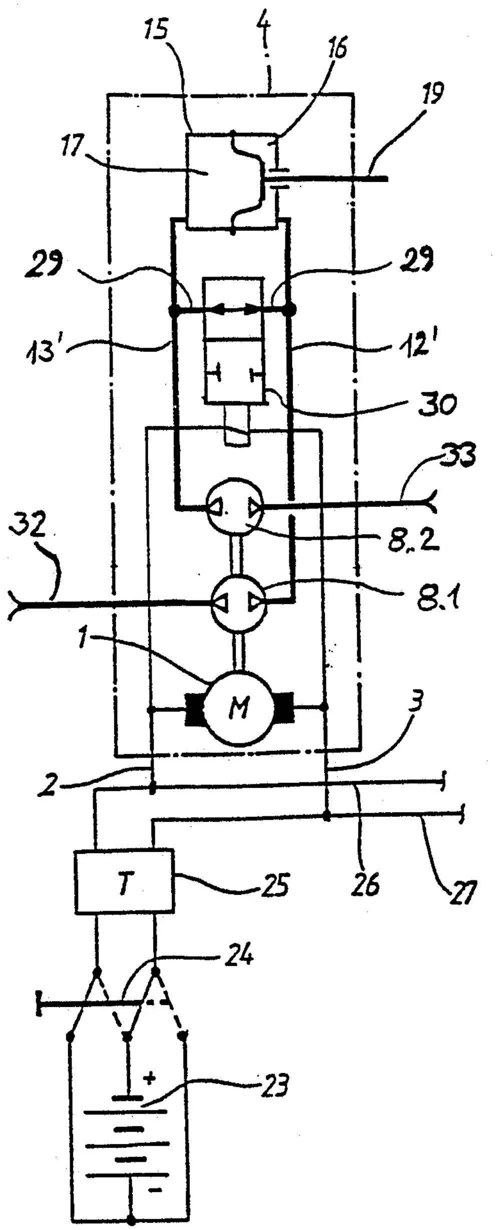
FIG. 7 is a schematic circuit diagram for the adjusting drive according to FIGS. 5 and 6 with an added by-pass line and solenoid valve.

In the same way as already shown by FIG. 4, the pressure difference equalization in the fluidic system of the modified two pump species of FIGS. 5 and 6 can also take place by way of a by-pass line 29 and a solenoid valve 30 arranged between the two working chambers 16, 17 of the working element 15 and between the flow channels 12', 13' charged by the pumps 8.1, 8.2, respectively, as schematically shown by FIG. 7. The electric circuit is similar to the one shown by FIG. 3, with a reversible driven electric motor 1, and the solenoid valve 30 is again connected in parallel with the electric motor 1. During the running period of the electric motor 1 and of the pumps 8.1 and 8.2, which is limited by the timing element 25, the build-up of the desired pressure difference in the working element 15 is assured.

In exact analogy to the first embodiment, the adjusting operations proceed very rapidly and very reliably with the adjusting drive modification described last

- by simultaneous actuation of the piston working element with vacuum, on the one hand, and excess pressure, on the other,
- by slight rates of fluid flow, and
- by a small volume of the fluidic force transmission system.

The equalization of the pressure difference also takes place, as already described, by way of flow short circuits in the two pump chambers so that the fluidic system in the rest condition is under atmospheric pressure and the force transmission system is freely movable.

Even though the embodiments refer only to a linearly movable working element 15, also other working elements can be used as output part in the present invention, for example, working elements rotating with the pump may be used as output part of the force transmission, above all with the use of a hydraulic system for producing high adjusting forces, which fall within the scope of this invention. These high adjusting forces may find application advantageously with non-linear adjusting travels of an adjusting member 19 whereby by a corresponding filling of the hydraulic system in a known manner, an influence can be exerted on the slippage between driving and driven part of the force transmission. Non-linear movements of an adjusting member may be required, for example, with the connection thereof with a fan flap or a door closure assist.

Of course, different types of pumps may also be used for the pump 8 in lieu of the vane-type pump, for example, piston pumps or rotary pumps (centrifugal pumps).

While we have shown and described several embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. An adjusting drive, comprising closed housing means, a fluidic system at least partly filled with air in said housing means including within said housing means an electric motor, pump means having chamber means and driven by the electric motor, and a piston working element movable within working chamber means by pressure actuation by a fluid conveyed by the pump means through fluid channel means integrated into said housing means, and an adjusting member operatively connected with the piston working element and extended in a pressure-tight manner out of the housing means, said adjusting member being movable to and fro between two end positions together with said piston working element, pressure differences in the fluidic system being automatically equalized after stoppage of the rotation of the pump means, the pump means including two pump rotors, two separate pump chamber means being provided in the housing means, each of said pump rotors being arranged in a respective pump chamber means, a first one of said flow channel means extending from the first pump chamber means by way of a pressure connection to a first working chamber means of the piston working element, a second flow channel means extending from the second pump chamber means by way of a pressure connection to a second working chamber means of the double-acting piston working element, both pump chamber means having each an atmosphere connection which, in relation to the respective pressure connection of the pump chamber means, is arranged on the pressure side of the respective pump rotor disposed opposite to the pressure connection, the pressure connections and the atmosphere connections being arranged in such a manner that one pump rotor supplies air from the atmosphere connection to the pressure connection of its pump chamber means and at the same time the respective other pump rotor supplies air from the pressure connection to the atmosphere connection of its pump chamber means when the electric motor rotates which is reversible in its direction of rotation so that, depending on the rotation of the electric motor, one working chamber means is acted upon with excess pressure and the respective other working chamber means is acted upon at the same time with vacuum.

2. An adjusting drive according to claim 1, wherein the two pump rotors are constructed as constructively identical vane-type pump rotors.

3. An adjusting drive according to claim 2, wherein the two vane-type pump rotors are secured on the armature shaft of the electric motor and are driven by the latter in the same direction of rotation.

4. An adjusting drive according to claim 1, wherein the pressure difference equalization between the two working chamber means takes place through the pump chamber means and the atmospheric connections with the atmospheric air.

5. An adjusting drive according to claim 1, further comprising a by-pass line including a solenoid valve closing the by-pass line during the operation of the electric motor, said by-pass line being fluidically arranged between the two working chamber means of the piston working elements, and the pressure difference equalization taking place by way of said by pass line.

6. An adjusting drive according to claim 1, wherein the two working chamber means are separated by a piston diaphragm of the piston working element clamped-in sealingly between two housing parts of the housing means, and wherein one flow channel means extends through a wall of the first housing part, through a wall of the second housing part and through an opening of the piston diaphragm clamped-in on all sides in the transition between the two housing parts.

7. An adjusting drive according to claim 5, wherein the electric motor and the pump rotors connected with the electric motor shaft are arranged in a respective chamber means of the housing means, and wherein said chamber means are closed off pressure-tight by plug means after the insertion of the electric motor and the assembly of the pump rotors.

8. An adjusting drive according to claim 9, wherein the two pump rotors are constructed as constructively identical vane-type pump rotors.

9. An adjusting drive according to claim 8, wherein the two vane-type pump rotors are secured on the armature shaft of the electric motor and are driven by the latter in the same direction of rotation.

10. An adjusting drive according to claim 1, wherein the electric motor and the pump rotors connected with the electric motor shaft are arranged in a respective chamber means of the housing means, and wherein said chamber means are closed off pressure-tight by plug means after the insertion of the electric motor and the assembly of the pump rotors.

* * * * *